(12) United States Patent
Nagao et al.

(10) Patent No.: US 10,190,600 B2
(45) Date of Patent: Jan. 29, 2019

(54) PRESSURE INCREASING SYSTEM AND METHOD OF INCREASING GAS PRESSURE

(71) Applicant: MITSUBISHI HEAVY INDUSTRIES COMPRESSOR CORPORATION, Tokyo (JP)

(72) Inventors: Hideki Nagao, Hiroshima (JP); Naoto Yonemura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/548,590

(22) PCT Filed: Sep. 14, 2016

(86) PCT No.: PCT/JP2016/077083
§ 371 (c)(1),
(2) Date: Aug. 3, 2017

(87) PCT Pub. No.: WO2018/051428
PCT Pub. Date: Mar. 22, 2018

(65) Prior Publication Data
US 2018/0238350 A1 Aug. 23, 2018

(51) Int. Cl.
*F04B 41/06* (2006.01)
*F04D 29/58* (2006.01)
(Continued)

(52) U.S. Cl.
CPC ............ *F04D 29/5833* (2013.01); *B01J 3/00* (2013.01); *B01J 19/00* (2013.01); *F04B 41/06* (2013.01);
(Continued)

(58) Field of Classification Search
CPC .... F04D 27/0207; F04D 13/08; F04D 13/086; F04B 41/02; F04B 41/06; F04B 23/04
(Continued)

(56) References Cited

U.S. PATENT DOCUMENTS 2,453,095 A * 11/1948 McGrath ................... F25B 1/10
417/2
2,539,896 A * 1/1951 Dalrymple .............. F04B 39/16
417/250

(Continued)

FOREIGN PATENT DOCUMENTS

EP 2 990 102 A1 3/2016
JP 2010-266154 A 11/2010
(Continued)

OTHER PUBLICATIONS

International Search Report dated Dec. 13, 2016 in PCT Application No. PCT/JP2016/077083.

*Primary Examiner* — Patrick Hamo
(74) *Attorney, Agent, or Firm* — Birch, Stewart, Kolasch & Birch, LLP

(57) ABSTRACT

A pressure increasing system includes a plurality of stages of compressors configured to compress carbon dioxide to a pressure higher than a critical pressure; intermediate coolers cooling the carbon dioxide discharged from a compressor in a preceding stage; a subcooler provided between a seventh stage compressor in the final stage and a sixth stage compressor in a preceding stage and cools the carbon dioxide; a bypass line through which the carbon dioxide in the inlet of the seventh stage compressor is extracted, depressurized and supplied to the subcooler as a refrigerant; a flow rate adjusting valve provided on the bypass line; and a control unit configured to regulate a degree of opening of the flow rate adjusting valve so that at least one of a temperature and (Continued)

a pressure of the carbon dioxide in the inlet of the seventh stage compressor remains constant.

5 Claims, 3 Drawing Sheets

(51) Int. Cl.
    *B01J 19/00*           (2006.01)
    *B01J 3/00*            (2006.01)
    *F04C 29/04*          (2006.01)
    *F04D 27/00*          (2006.01)
    *F25B 19/00*          (2006.01)
    *F04B 49/06*          (2006.01)

(52) U.S. Cl.
    CPC ............ *F04B 49/065* (2013.01); *F04C 29/04* (2013.01); *F04D 27/00* (2013.01); *F04D 27/009* (2013.01); *F25B 19/00* (2013.01); *F04B 2205/065* (2013.01); *F04B 2205/112* (2013.01)

(58) Field of Classification Search
    USPC ........................................................ 417/250
    See application file for complete search history.

(56) References Cited

U.S. PATENT DOCUMENTS

| | | | | |
|---|---|---|---|---|
| 2,772,828 | A * | 12/1956 | Bush | F04B 39/06 417/248 |
| 2,946,184 | A * | 7/1960 | Jendrassik | F04F 13/00 417/207 |
| 6,113,358 | A * | 9/2000 | Young | F04B 41/06 417/250 |
| 6,220,053 | B1 | 4/2001 | Hass, Jr. et al. | |
| 7,871,239 | B2 * | 1/2011 | Sorokes | F04D 29/624 415/116 |
| 2009/0193842 | A1 * | 8/2009 | Tsukamoto | F04D 29/441 62/498 |
| 2013/0156543 | A1 | 6/2013 | Sassanelli et al. | |
| 2014/0069141 | A1 | 3/2014 | Yonemura et al. | |
| 2015/0104329 | A1 * | 4/2015 | Chin | F04B 49/007 417/53 |
| 2015/0184660 | A1 * | 7/2015 | Schramm | F04D 13/086 417/250 |
| 2016/0123351 | A1 | 5/2016 | Nagao et al. | |

FOREIGN PATENT DOCUMENTS

| | | |
|---|---|---|
| JP | 2013-519864 A | 5/2013 |
| JP | 5826265 B2 | 12/2015 |
| WO | WO 2014/041654 A1 | 3/2014 |
| WO | WO 2015/107615 A1 | 7/2015 |

* cited by examiner

PRESSURE INCREASING SYSTEM AND METHOD OF INCREASING GAS PRESSURE

TECHNICAL FIELD

The present invention relates to a pressure increasing system configured to increase a gas pressure and a method of increasing a gas pressure.

BACKGROUND ART

A pressure increasing system is a device configured to increase a pressure of a target gas to a target pressure.

In recent years, problems such as global warming due to increases in emission of carbon dioxide, which is known as a greenhouse gas, has become significant. In particular, a technique in which, when a large amount of carbon dioxide is contained in exhaust gases from thermal power plants, the carbon dioxide is separated out and collected, a pressure increasing system then increases a pressure, the gas is stored in the ground or the seabed, and carbon dioxide in the atmosphere is reduced is known.

More specifically, in the pressure increasing system, carbon dioxide is repeatedly compressed and cooled by compressors and an intercooler which are provided in multiple stages, and carbon dioxide with a critical pressure or higher and a critical temperature or higher is then additionally cooled. Therefore, carbon dioxide with a temperature and pressure optimal for transport and storage is obtained.

Here, in the pressure increasing system disclosed in Patent Literature 1, some of the carbon dioxide (intermediate supercritical pressure liquid) with a critical pressure or higher is extracted in a portion before a pump portion, is depressurized to about the critical pressure and is used as a refrigerant for cooling the carbon dioxide itself. In the pressure increasing system disclosed in Patent Literature 1, when the same gas is used as the refrigerant, it is furthermore possible to cool the carbon dioxide to about the critical temperature at which it is suitable to increase a pressure in the pump portion in contrast to when carbon dioxide is cooled using only a general cooler (a shell and tube type heat exchanger). Therefore, it is possible to reduce the power (head) required for increasing the pressure.

CITATION LIST

Patent Literature

[Patent Literature 1]
Japanese Patent No. 5826265

SUMMARY OF INVENTION

Technical Problem

Incidentally, when a final required pressure of carbon dioxide is about 10 [MPa], it is possible to increase a pressure of carbon dioxide with a compressor only without using the pump in a final pressure increasing step as disclosed in the pressure increasing system in Patent Literature 1. In this case, in general, since an inlet of the final stage compressor is at a critical pressure or higher, a region with a critical pressure or higher and at about a critical temperature is a region in which physical properties easily change. Therefore, in order to increase a pressure stably with a compressor, carbon dioxide supplied to the final stage compressor needs to have a certain constant temperature or higher (for example, 60° C. or higher) outside a region (transition zone) in which physical properties easily change.

However, as in Patent Literature 1, after cooling with an intercooler, when carbon dioxide is additionally cooled using carbon dioxide as a refrigerant, there is a possibility of the temperature of the carbon dioxide being excessively lowered and the temperature entering the above transition zone, which is not suitable for compression in a compressor.

The present invention provides a pressure increasing system and a method of increasing a gas pressure through which it is possible to cool a supercritical pressure gas sufficiently and stably and it is possible to obtain a gas in a state suitable for compression in a compressor after cooling.

Solution to Problem

A pressure increasing system according to a first aspect of the present invention includes a plurality of stages of compressors configured to compress a gas to a target pressure higher than a critical pressure; intermediate coolers that are provided between the plurality of stages of compressors and cool the gas discharged from a compressor in a preceding stage; a subcooler that is provided between the final stage compressor and a compressor in a stage before the final stage and cools the gas; a bypass line which is connected to an inlet of the final stage compressor and through which the gas in the inlet of the final stage compressor is extracted and supplied to the subcooler as a refrigerant; a flow rate adjusting valve which is provided on the bypass line and by which the extracted gas is depressurized upstream from the subcooler; and a control unit configured to regulate a degree of opening of the flow rate adjusting valve so that at least one of a temperature and a pressure of the gas in the inlet of the final stage compressor remains constant.

Since the subcooler and the bypass line are provided, the gas that is extracted from the inlet of the final stage compressor and is depressurized is used in the subcooler as a refrigerant, and the control unit adjusts the degree of opening of the flow rate adjusting valve provided on the bypass line, it is possible to regulate at least one of a temperature and a pressure of a gas supplied to the inlet of the final stage compressor as a flash-gas of the gas itself. Therefore, when a temperature of the refrigerant in the intermediate cooler changes due to an external factor such as an outside air temperature and a temperature of the gas cooled in the intermediate cooler changes and as a result a pressure changes, at least one of a temperature and a pressure of the gas supplied to the inlet of the final stage compressor is likely to remain constant. Therefore, it is possible to prevent physical properties of the gas from greatly changing and it is possible to cool the gas sufficiently and stably. Therefore, a gas, which has been cooled to, for example, 60° C., in the intercooler of the related art, can be cooled to 40° C. according to the present invention outside a region in which physical properties are likely to greatly change, and it is possible to reduce a motive power (head) of the final stage compressor when the pressure is increased in the final stage compressor.

In a pressure increasing system according to a second aspect of the present invention, the bypass line in the first aspect may connect the inlet of the final stage compressor to an inlet of the compressor in a stage before the final stage, and the control unit may regulate the degree of opening of the flow rate adjusting valve so that the occurrence of surging in the compressor in a stage before the final stage is prevented.

The gas compressed in the compressor in a stage before the final stage is returned to an inlet of the compressor in a stage before the final stage through the bypass line. Therefore, the bypass line serves as a recycling line and the degree of opening of the flow rate adjusting valve of the bypass line is regulated. Therefore, the flow rate adjusting valve can be used as an anti-surge valve for preventing the occurrence of surging in the compressor in a stage before the final stage.

In addition, the subcooler (refrigerant side) downstream from the flow rate adjusting valve can supply the gas which has been depressurized by the flow rate adjusting valve and had a low temperature in a heated state to the compressor in a stage before the final stage. Therefore, the subcooler can be used as a recycling heater for a recycled gas (a gas that flows in the bypass line). Therefore, without providing a separate recycling heater for heating a recycled gas, it is possible to heat a gas supplied to the compressor in a stage before the final stage and a recycling operation for preventing surging can be performed.

In a pressure increasing system according to a third aspect of the present invention, the pressure increasing system according to the first or second aspect may further include a sensor configured to measure at least one of a temperature and a pressure of the gas in the inlet of the final stage compressor, and the control unit may regulate the degree of opening of the flow rate adjusting valve based on a value measured by the sensor.

Since the degree of opening of the flow rate adjusting valve can be regulated based on a value measured by such a sensor, at least one of a temperature and a pressure of the gas supplied to the inlet of the final stage compressor can remain constant and it is possible to prevent physical properties of the gas from greatly changing.

In the pressure increasing system according to a fourth aspect of the present invention, the pressure increasing system according to any one of the first to third aspects may further include a recycling line which connects an outlet of the final stage compressor to an inlet of the subcooler and through which the gas from the outlet of the final stage compressor is capable of being supplied to the inlet of the final stage compressor through the subcooler.

When such a recycling line is provided, the gas compressed in the final stage compressor is returned as a recycled gas to the inlet of the final stage compressor. Therefore, it is possible to increase a flow rate of the gas that flows in the final stage compressor. Therefore, it is possible to prevent the occurrence of surging in the final stage compressor. In addition, when the gas compressed in the final stage compressor is returned to the inlet of the final stage compressor through the subcooler via the recycling line, while the gas from the recycling line is cooled in the subcooler, it can be supplied to the final stage compressor. Therefore, the subcooler can be used as a recycling cooler for a recycled gas. Therefore, without providing a separate recycling cooler for cooling a recycled gas, it is possible to cool a gas supplied to the final stage compressor and a recycling operation for preventing surging can be performed.

A method of increasing a gas pressure according to a fifth aspect of the present invention includes a compression cooling process in which a gas is repeatedly compressed and cooled in stages so that the gas has a target pressure higher than a critical pressure; a subcooling process in which the gas is capable of being additionally cooled before the final compression of the gas in the compression cooling process; a gas extracting process in which, before the final compression in the compression cooling process, the gas is extracted and depressurized, and is used as a refrigerant for cooling the gas in the subcooling process; and a flow rate adjusting process in which a flow rate of the gas extracted in the gas extracting process is adjusted so that at least one of a temperature and a pressure of the gas immediately before the final compression in the compression cooling process remains constant.

When the gas that is extracted from the inlet of the final stage compressor and is depressurized is used as a refrigerant in the subcooling process and the flow rate adjusting process is performed, it is possible to adjust at least one of a temperature and a pressure of a gas supplied to the inlet of the final stage compressor by a flash-gas of the gas itself such that it has a constant level. Therefore, it is possible to cool the gas supplied to the inlet of the final stage compressor sufficiently and stably. Therefore, it is possible to reduce a motive power (head) of the final stage compressor when the pressure is increased in the final stage compressor.

Advantageous Effects of Invention

According to the pressure increasing system and the method of increasing a gas pressure of the present invention, it is possible to cool a supercritical pressure gas sufficiently and stably and it is possible to obtain a gas in a state suitable for compression in a compressor after cooling.

DESCRIPTION OF EMBODIMENTS

A pressure increasing system 1 according to an embodiment of the present invention will be described below. The pressure increasing system 1 of the present embodiment is a geared compressor configured to increase a pressure and a temperature of carbon dioxide gas F to a predetermined level so that the gas can be stored in the ground or the seabed. This geared compressor is a multi-shaft and multi-stage compressor in which a plurality of impellers are linked through a gear.

Figure 1:
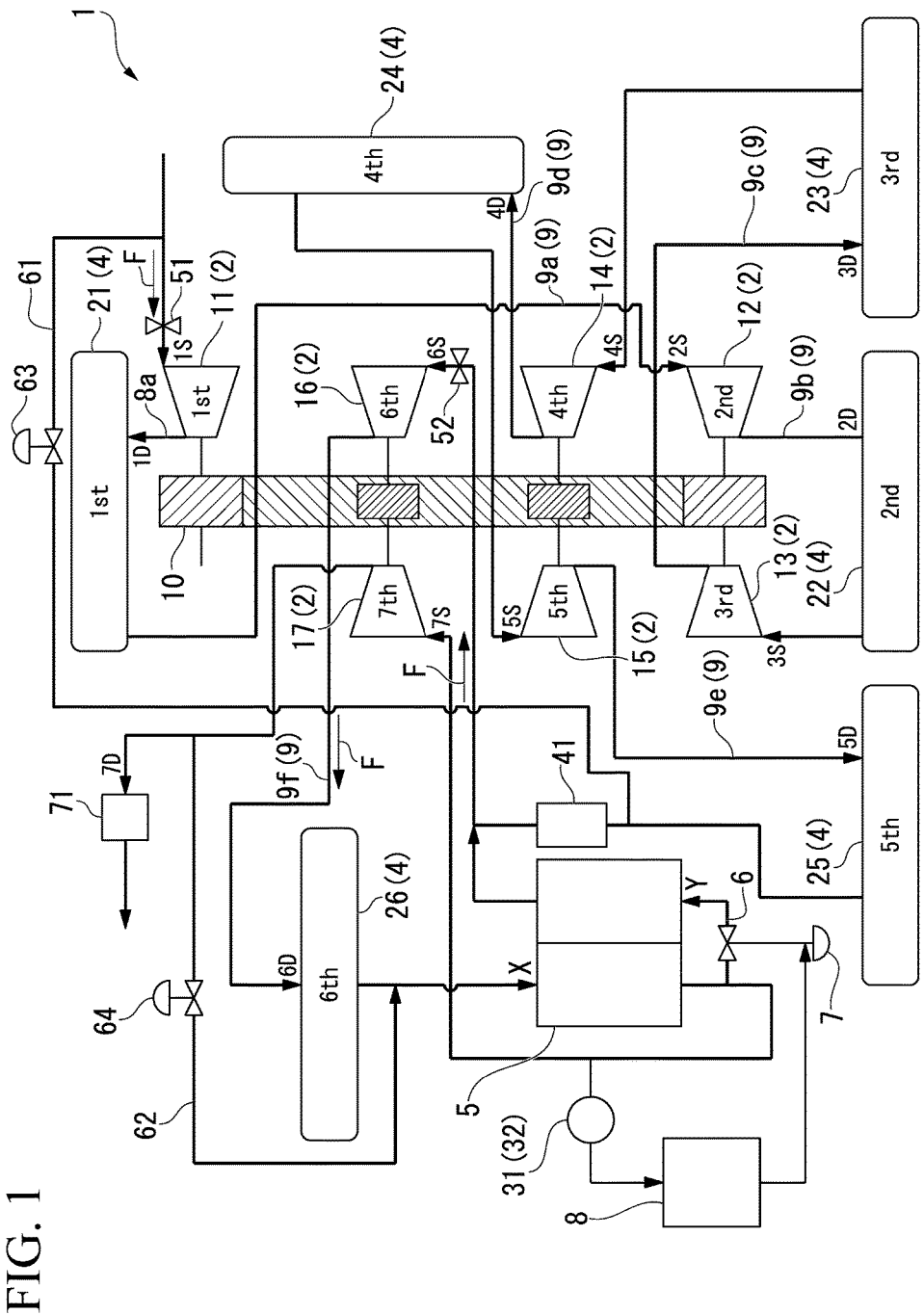
FIG. 1 is a system diagram schematically showing a pressure increasing system according to an embodiment of the present invention.

As shown in FIG. 1, the pressure increasing system 1 includes compressors 2 that are configured to take carbon dioxide gas F in and compress it and are provided in a plurality of stages, intermediate coolers 4 provided between stages of the compressors 2, and a subcooler 5 provided between the final stage compressor 2 and the compressor 2 in a stage before the final stage.

In addition, the pressure increasing system 1 includes a bypass line 6 that connects an inlet of the final stage compressor 2 and the subcooler 5, a flow rate adjusting valve 7 provided on the bypass line 6, and a control unit 8 configured to regulate the degree of opening of the flow rate adjusting valve 7.

In the present embodiment, the compressors 2 are provided in seven stages. That is, from the lowest stage side to the highest stage side, a first stage compressor 11, a second stage compressor 12, a third stage compressor 13, a fourth stage compressor 14, a fifth stage compressor 15, a sixth stage compressor 16 (the compressor 2 in a stage before the final stage), and a seventh stage compressor 17 (the final stage compressor 2) are provided. The compressors 2 each include an impeller configured to compress a gas by rotation.

In the present embodiment, the second stage compressor 12 and the third stage compressor 13 are coaxially provided as a set, the fourth stage compressor 14 and the fifth stage compressor 15 are coaxially provided as a set, and the sixth stage compressor 16 and the seventh stage compressor 17 are coaxially provided as a set. Further, the shaft of the first stage compressor 11 and the shaft of each of the above sets are connected through a gear 10.

The intermediate coolers 4 are provided one at a time on a pipeline 9 that connects stages of the compressors 2. The intermediate coolers 4 are provided between all stages of the compressors 2 in the present embodiment. That is, from the lowest stage side to the highest stage side, the intermediate coolers 4 include a first intermediate cooler 21 provided on a pipeline 9a, a second intermediate cooler 22 provided on a pipeline 9b, a third intermediate cooler 23 provided on a pipeline 9c, a fourth intermediate cooler 24 provided on a pipeline 9d, a fifth intermediate cooler 25 provided on a pipeline 9e, and a sixth intermediate cooler 26 provided on a pipeline 9f.

The intermediate coolers 4 are, for example, a shell and tube type heat exchanger.

In the intermediate coolers 4, cooling water is used as a refrigerant. The intermediate coolers 4 cool carbon dioxide F discharged from the compressor 2 in the preceding stage and supply it to the compressor 2 in the subsequent stage.

According to the plurality of stages of compressors 2 and the intermediate coolers 4, the carbon dioxide F taken into the first stage compressor 11 is compressed and pressurized so that it has a target pressure higher than the critical pressure 7.4 [MPa]. In the present embodiment, the carbon dioxide F is pressurized to the critical pressure or higher by the sixth stage compressor 16, and then additionally pressurized to the target pressure, for example, about 12 [MPa], by the seventh stage compressor 17.

The subcooler 5 is provided on the pipeline 9f that connects the sixth stage compressor 16 and the seventh stage compressor 17 and is provided between an outlet of the sixth intermediate cooler 26 and an inlet of the seventh stage compressor 17. For the subcooler 5, for example, a so-called multichannel plate type heat exchanger in which a plurality of plates are laminated is used. Such a heat exchanger has a structure in which a plate in which a flow channel through which a refrigerant flows is formed and a plate in which a flow channel through which a fluid to be cooled (in the present embodiment, the carbon dioxide F) flows is formed are alternately laminated.

The bypass line 6 has one end that is connected to the pipeline 9f connecting the sixth stage compressor 16 and the seventh stage compressor 17. More specifically, the one end is connected to the pipeline 9f between the inlet of the seventh stage compressor 17 and an outlet of the subcooler 5.

The bypass line 6 includes the other end that is connected to the pipeline 9e connecting the fifth stage compressor 15 and the sixth stage compressor 16. More specifically, the other end is connected to the pipeline 9e between an inlet of the sixth stage compressor 16 and an outlet of the fifth intermediate cooler 25. In addition, the bypass line 6 is also connected to the subcooler 5 so as to pass through the subcooler 5. Through the bypass line 6, the carbon dioxide F in the inlet of the seventh stage compressor 17 is extracted and the extracted carbon dioxide F can be supplied to the subcooler 5 as a refrigerant.

The flow rate adjusting valve 7 is provided between one end of the bypass line 6 and the subcooler 5. When the degree of opening of the flow rate adjusting valve 7 is regulated, the carbon dioxide F extracted from the inlet of the seventh stage compressor 17 is depressurized due to the Joule-Thomson effect and a low temperature refrigerant is generated. In the present embodiment, the carbon dioxide F is depressurized to about 5 [MPa] below the critical pressure. Furthermore, in the subcooler 5, the depressurized carbon dioxide F exchanges heat with the carbon dioxide F that flows in the pipeline 9f connecting the sixth stage compressor 16 and the seventh stage compressor 17, and then flows into the pipeline 9e from the other end of the bypass line 6 at a position at which the pressure is the same as in the pipeline 9e connecting the fifth stage compressor 15 and the sixth stage compressor 16 (refer to dashed lines in FIG. 2).

The control unit 8 adjusts the degree of opening of the flow rate adjusting valve 7 so that at least one of a temperature and a pressure of the carbon dioxide F in the inlet of the seventh stage compressor 17 remains constant, and adjusts a flow rate of the carbon dioxide F that flows in the bypass line 6, that is, a refrigerant in the subcooler 5.

Here, between one end of the bypass line 6 and the inlet of the seventh stage compressor 17, at least one of a temperature sensor 31 and a pressure sensor 32 is provided on the pipeline 9f. Furthermore, the control unit 8 adjusts the degree of opening of the flow rate adjusting valve 7 based on the measured value of the temperature that is measured by the temperature sensor 31 (or the measured value of the pressure measured by the pressure sensor 32).

In the present embodiment, the pressure increasing system 1 further includes a dehydrator 41 provided on the pipeline 9e that connects the fifth stage compressor 15 and the sixth stage compressor 16, a first stage inlet guide vane 51 provided at an inlet of the first stage compressor 11, a sixth stage inlet guide vane 52 provided at the inlet of the sixth stage compressor 16, a lower stage side recycling line 61 that connects an outlet of the fifth stage compressor 15 to the inlet of the first stage compressor 11, a higher stage side recycling line 62 that connects an outlet of the seventh stage compressor 17 to the inlet of the sixth stage compressor 16, and an aftercooler 71 provided at the outlet of the seventh stage compressor 17.

The dehydrator 41 is provided between the outlet of the fifth intermediate cooler 25 and the inlet of the sixth stage compressor 16 and dehydrates the carbon dioxide F that flows in the pipeline 9e.

The first stage inlet guide vane 51 is provided at the inlet of the first stage compressor 11 and adjusts a flow rate of the carbon dioxide F supplied to the first stage compressor 11. The sixth stage inlet guide vane 52 is provided at the inlet of the sixth stage compressor 16 and adjusts a flow rate of the carbon dioxide F supplied to the sixth stage compressor 16. The sixth stage inlet guide vane 52 is disposed between the sixth stage compressor 16 and the dehydrator 41.

The lower stage side recycling line 61 has one end that is connected to the outlet of the fifth stage compressor 15 and the outlet of the fifth intermediate cooler 25. The lower stage side recycling line 61 has the other end that is connected to the inlet of the first stage compressor 11 and an inlet of the first stage inlet guide vane 51.

An adjusting valve 63 is provided in the lower stage side recycling line 61. When the degree of opening of the adjusting valve 63 is adjusted, a flow rate of the carbon dioxide F that flows from the outlet of the fifth intermediate cooler 25 to the inlet of the first stage compressor 11 through the lower stage side recycling line 61, that is, a recycled gas, is adjusted.

The higher stage side recycling line 62 has one end that is connected to the outlet of the seventh stage compressor 17. The higher stage side recycling line 62 has the other end that is connected to the pipeline 9f at an outlet of the sixth stage compressor 16, the outlet of the sixth intermediate cooler 26, and an inlet of the subcooler 5. An adjusting valve 64 is provided in the higher stage side recycling line 62. When the degree of opening of the adjusting valve 64 is adjusted, a flow rate of the carbon dioxide F that flows from the outlet of the seventh stage compressor 17 to the inlet of the subcooler 5 through the higher stage side recycling line 62, that is, a recycled gas, is adjusted.

The aftercooler 71 is provided downstream from the one end of the higher stage side recycling line 62 at the outlet of the seventh stage compressor 17. The aftercooler 71 additionally cools the carbon dioxide F discharged from the seventh stage compressor 17. In the present embodiment, the carbon dioxide F discharged from the seventh stage compressor 17 is cooled to about 40 [° C.] higher than the critical temperature (31.1 [° C.]).

Figure 2:
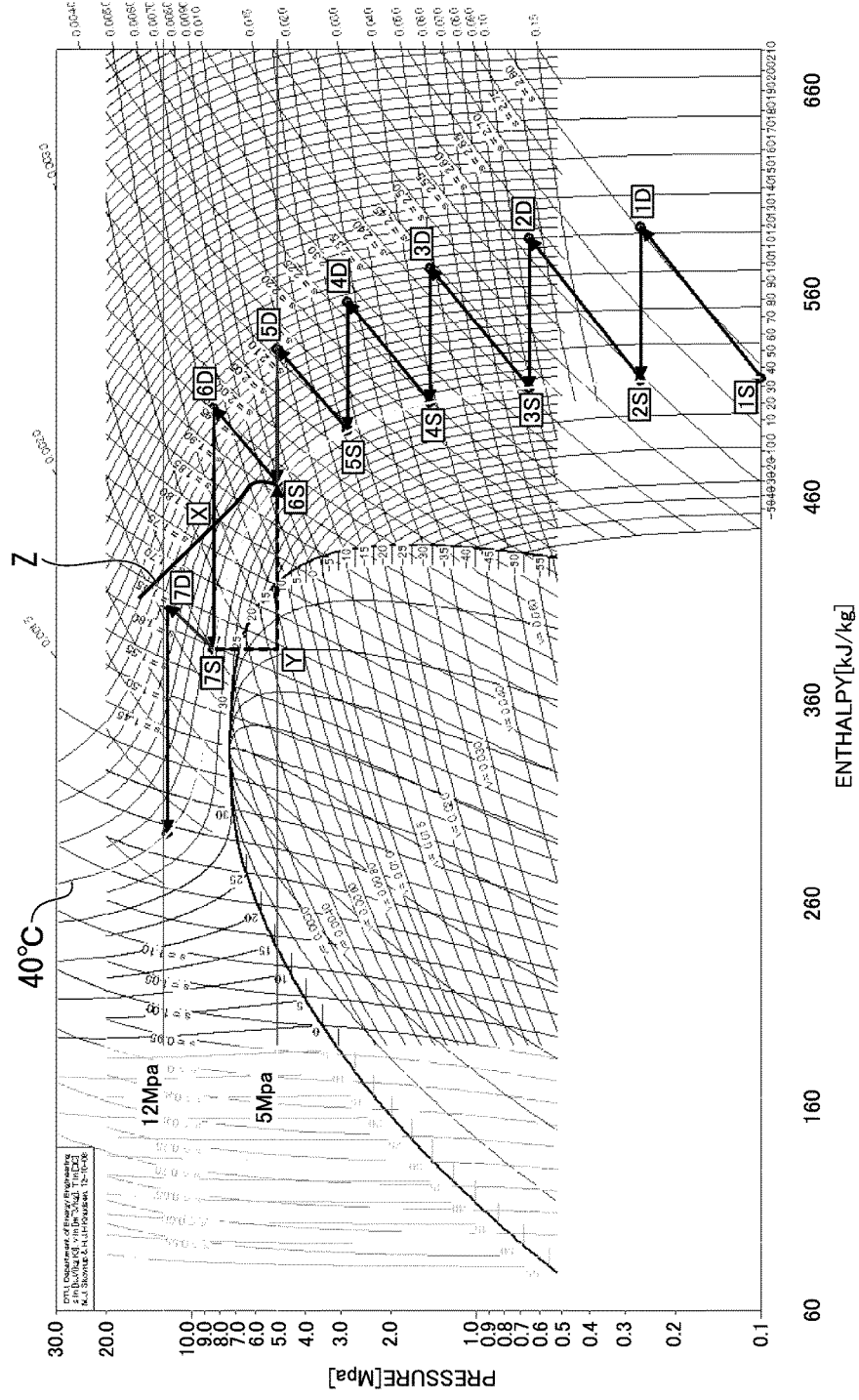
FIG. 2 is a diagram of P-h lines showing states of carbon dioxide whose pressure is increased by the pressure increasing system according to the embodiment of the present invention.
Figure 3:
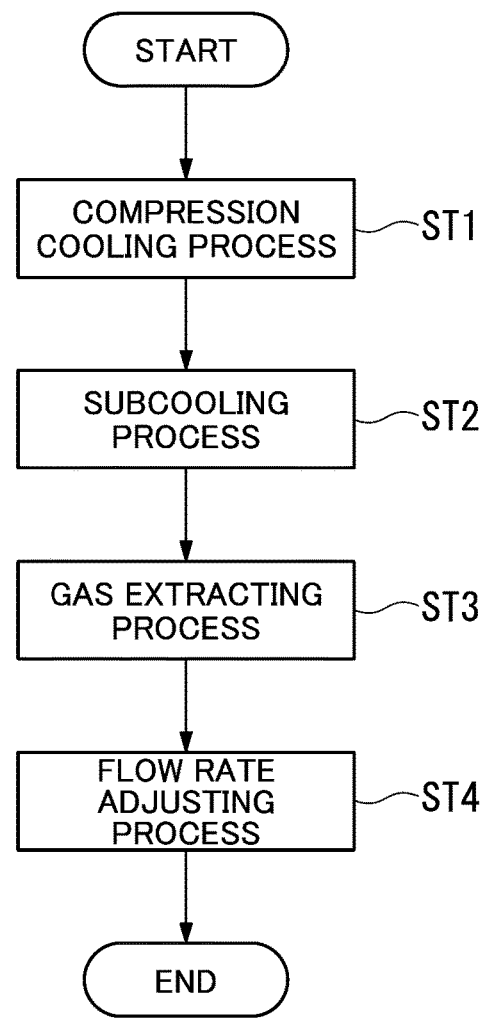
FIG. 3 is a flowchart of a method of increasing a pressure using the pressure increasing system according to the embodiment of the present invention.

Next, a change of state of the carbon dioxide F and a method of increasing a pressure of the carbon dioxide F will be described with reference to a diagram of P-h lines in FIG. 2.

The carbon dioxide F (in a state 1S) introduced into the first stage compressor 11 is in a state 1D in which the pressure and the temperature are higher than in the state 1S by compressing the carbon dioxide F by the first stage compressor 11. Furthermore, the state is changed to a state 2S in which the carbon dioxide F is cooled by the first intermediate cooler 21 at a constant pressure. Furthermore, the carbon dioxide F is repeatedly compressed and cooled by the compressor 2 and the intermediate cooler 4 and the state is changed to state 2S→state 2D→state 3S→state 3D→state 4S→state 4D→state 5S→state 5D→state 6S→state 6D. Furthermore, the pressure of the carbon dioxide F is brought to a critical pressure or higher by the sixth stage compressor 16 (a compression cooling process ST1).

The carbon dioxide F in the state 6D then sequentially flows into the sixth intermediate cooler 26 and the subcooler 5 and is cooled to about 40 [° C.] at a constant pressure through a state X and is brought into a state 7S (the compression cooling process ST1, a subcooling process ST2). That is, control is performed such that, when the carbon dioxide F is supplied to the subcooler 5, the temperature remains constant at a certain set value (in the present embodiment, about 40 [° C.]) which is a constant temperature (a constant pressure), and the state becomes the state 7S.

The state X is positioned on a line Z along which physical properties of carbon dioxide with a supercritical pressure and supercritical temperature are most unstable within a region in which the physical properties are stable. Physical properties become more stable from the line Z to the right side (a higher temperature) on the plane of the paper in FIG. 2.

Some of the carbon dioxide F that is cooled by the subcooler 5 and is in the state 7S is extracted into the bypass line 6 and is depressurized and becomes carbon dioxide F in a state Y with the same pressure (in the present embodiment, about 5 [MPa]) as in the state 6S and a lower temperature than in the state 6S. The carbon dioxide F is heated when used as a refrigerant in the subcooler 5 and has the same pressure and temperature as in the state 6S and merges with carbon dioxide F in the pipeline 9e at the inlet of the sixth stage compressor 16 (a gas extracting process ST3).

In addition, a flow rate of the carbon dioxide F that is extracted in the gas extracting process ST3 and flows in the bypass line 6 as a refrigerant is adjusted by the control unit 8 so that at least one of a temperature and a pressure of the carbon dioxide F (in the state 7S) that is cooled and generated in the subcooler 5 and is supplied to the seventh stage compressor 17 remains constant (a flow rate adjusting process ST4).

Furthermore, the carbon dioxide F (in the state 7S) is additionally compressed by the seventh stage compressor 17 and is brought into a state 7D (the compression cooling process ST1), is cooled by the aftercooler 71 at a constant pressure, and carbon dioxide F with a critical temperature or higher (in the present embodiment, about 40 [° C.]) and a supercritical pressure (in a target pressure state) is generated.

According to the pressure increasing system 1, the carbon dioxide F that is extracted from the inlet of the seventh stage compressor 17 which is the final stage compressor 2 and is depressurized is supplied to the subcooler 5 through the bypass line 6 and is used as a refrigerant in the subcooler 5, and the control unit 8 regulates the degree of opening of the flow rate adjusting valve 7 provided on the bypass line 6. Therefore, it is possible to perform cooling while the temperature (pressure) of the carbon dioxide F supplied to the inlet of the seventh stage compressor 17 is regulated such that it has a constant level by a flash-gas of the gas itself.

Therefore, when the temperature of the carbon dioxide F that has been cooled by the sixth intermediate cooler 26 changes and as a result the pressure changes, it is possible to control the temperature (pressure) of the carbon dioxide F supplied to the inlet of the seventh stage compressor 17 sufficiently and stably. Therefore, the carbon dioxide F is cooled to a region in which physical properties greatly change, and it is possible to reduce a motive power (head) of the seventh stage compressor 17 when the pressure is increased by the seventh stage compressor 17, and it is possible to reduce the number of stages of the compressors 2 of the pressure increasing system 1.

Furthermore, in the present embodiment, the control unit 8 can regulate the degree of opening of the flow rate adjusting valve 7 provided on the bypass line 6 based on a value measured by at least one of the temperature sensor 31 and the pressure sensor 32. Therefore, it is possible to set at least one of the temperature and the pressure of the carbon dioxide F supplied to the inlet of the seventh stage compressor 17 more accurately. Accordingly, it is possible to prevent physical properties of the carbon dioxide F supplied to the inlet of the seventh stage compressor 17 from greatly changing. Therefore, the seventh stage compressor 17 can perform compression efficiently.

Furthermore, in the present embodiment, the control unit 8 may regulate the degree of opening of the flow rate adjusting valve 7 so that the occurrence of surging in the sixth stage compressor 16 is prevented.

In the present embodiment, when the bypass line 6 is provided, the carbon dioxide F compressed by the sixth stage compressor 16 is returned as a recycled gas to the inlet of the sixth stage compressor 16. Therefore, it is possible to increase a flow rate of the carbon dioxide F that flows in the sixth stage compressor 16. Therefore, due to the control unit 8, it is possible to prevent the occurrence of surging in the sixth stage compressor 16 which is on the higher stage side, and it is possible to operate the pressure increasing system 1 stably. That is, the flow rate adjusting valve 7 can be used as an anti-surge valve for preventing the occurrence of surging in the sixth stage compressor 16. In addition, when the degree of opening of the flow rate adjusting valve 7 is adjusted, it is possible to regulate a flow rate of a recycled gas in the sixth stage compressor 16 which is on the higher stage side according to an operation state.

In addition, when the carbon dioxide F compressed by the sixth stage compressor 16 is returned as a recycled gas to a refrigerant side inlet of the subcooler 5 through the bypass line 6, the recycled gas heated in the subcooler 5 can be supplied to the sixth stage compressor 16. Accordingly, the subcooler 5 can be used as a recycled gas heater (a recycling heater). Therefore, it is possible to heat the carbon dioxide F serving as a recycled gas before it is supplied to the sixth stage compressor 16 without providing a separate heater for heating a recycled gas. Therefore, a recycling operation for preventing surging can be performed.

Furthermore, in the present embodiment, since the higher stage side recycling line 62 is provided, the carbon dioxide F compressed by the seventh stage compressor 17 is returned as a recycled gas to the inlet of the seventh stage compressor 17. Therefore, it is possible to increase a flow rate of the carbon dioxide F that flows in the seventh stage compressor 17. Therefore, it is possible to prevent the occurrence of surging in the seventh stage compressor 17 which is on the higher stage side and it is possible to operate the pressure increasing system 1 stably. In addition, when the degree of opening of the adjusting valve 64 is regulated, it is possible to adjust a flow rate of a recycled gas in the seventh stage compressor 17 which is on the higher stage side according to an operation state.

Similarly, since the lower stage side recycling line 61 is provided, the carbon dioxide F compressed by the fifth stage compressor 15 is returned as a recycled gas to the inlet of the first stage compressor 11. Therefore, it is possible to increase a flow rate of the carbon dioxide F that flows into the fifth stage compressor 15 from the first stage compressor 11. Therefore, it is possible to prevent the occurrence of surging in the first stage compressor 11 to the fifth stage compressor 15 which are on the lower stage side. In addition, when the degree of opening of the adjusting valve 63 is adjusted, it is possible to adjust a flow rate of the recycled gas on the lower stage side according to an operation state.

In addition, when the carbon dioxide F compressed by the seventh stage compressor 17 is returned as a recycled gas to the inlet of the subcooler 5 through the higher stage side recycling line 62, the recycled gas cooled in the subcooler 5 can be supplied to the seventh stage compressor 17. Therefore, the subcooler 5 can be used as a recycled gas cooler. Therefore, it is possible to cool the carbon dioxide F serving as a recycled gas before it is supplied to the seventh stage compressor 17 without providing a separate cooler for cooling a recycled gas. Therefore, a recycling operation for preventing surging can be performed.

While preferable embodiments of the present invention have been described above, the present invention is not limited to the above embodiments.

Additions, omissions, substitutions, and other modifications of the configuration can be made without departing from the scope of the present invention. The present invention is not limited to the above descriptions, and is only limited by the scope of appended claims.

The sixth intermediate cooler 26 need not necessarily be provided.

In addition, the number of stages of the compressors 2 is not limited to that of the above-described embodiment.

In addition, while the above-described pressure increasing system 1 is a system in which carbon dioxide is the subject, it may be a system configured to increase a pressure of other gases.

In addition, the aftercooler 71 need not necessarily be provided.

INDUSTRIAL APPLICABILITY

The present invention relates to a pressure increasing system configured to increase a gas pressure and a method of increasing a gas pressure. According to the pressure increasing system and method of increasing a gas pressure of the present invention, it is possible to cool a supercritical pressure gas sufficiently and stably, and it is possible to obtain a gas in a state suitable for compression in a compressor after cooling.

REFERENCE SIGNS LIST

1 Pressure increasing system
2 Compressor
4 Intermediate cooler
5 Subcooler
6 Bypass line
7 Flow rate adjusting valve
8 Control unit
9 Pipeline
10 Gear
31 Temperature sensor
32 Pressure sensor
41 Dehydrator
51 First stage inlet guide vane
52 Sixth stage inlet guide vane
61 Lower stage side recycling line
62 Higher stage side recycling line
63 Adjusting valve
64 Adjusting valve
71 Aftercooler
F Carbon dioxide
ST1 Compression cooling process
ST2 Subcooling process
ST3 Gas extracting process
ST4 Flow rate adjusting process

The invention claimed is:
1. A pressure increasing system comprising:
a plurality of stages of compressors configured to compress a gas to a target pressure higher than a critical pressure;
intermediate coolers that are provided between the plurality of stages of compressors and cool the gas discharged from a compressor in a preceding stage;
a subcooler that is provided between the final stage compressor and a compressor in a stage before the final stage and cools the gas;
a bypass line which is connected to an inlet of the final stage compressor and through which the gas in the inlet of the final stage compressor is extracted and supplied to the subcooler as a refrigerant;
a flow rate adjusting valve which is provided on the bypass line and by which the extracted gas is depressurized upstream from the subcooler; and
a control unit configured to regulate a degree of opening of the flow rate adjusting valve so that at least one of a temperature and a pressure of the gas in the inlet of the final stage compressor remains constant.

2. The pressure increasing system according to claim 1,
wherein the bypass line connects the inlet of the final stage compressor to an inlet of the compressor in a stage before the final stage, and
wherein the control unit regulates a degree of opening of the flow rate adjusting valve so that the occurrence of surging in the compressor in a stage before the final stage is prevented.

3. The pressure increasing system according to claim 1, further comprising
a sensor configured to measure at least one of a temperature and a pressure of the gas in the inlet of the final stage compressor,
wherein the control unit regulates a degree of opening of the flow rate adjusting valve based on a value measured by the sensor.

4. The pressure increasing system according to claim 1, further comprising
a recycling line which connects an outlet of the final stage compressor to an inlet of the subcooler and through which the gas from the outlet of the final stage compressor is capable of being supplied to the inlet of the final stage compressor through the subcooler.

5. A method of increasing a gas pressure comprising:
a compression cooling process in which a gas is repeatedly compressed and cooled in stages so that the gas has a target pressure higher than a critical pressure;
a subcooling process in which the gas is capable of being additionally cooled before the final compression of the gas in the compression cooling process;
a gas extracting process in which, before the final compression in the compression cooling process, the gas is extracted and depressurized, and is used as a refrigerant for cooling the gas in the subcooling process; and
a flow rate adjusting process in which a flow rate of the gas extracted in the gas extracting process is adjusted so that at least one of a temperature and a pressure of the gas immediately before the final compression in the compression cooling process remains constant.

* * * * *